(12) United States Patent
Towner, III et al.

(10) Patent No.: US 6,255,985 B1
(45) Date of Patent: Jul. 3, 2001

(54) METHOD AND APPARATUS FOR OPTIMIZING RADAR SYSTEM PERFORMANCE

(75) Inventors: George C. Towner, III; Fred Brace, both of Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/228,580

(22) Filed: Jan. 11, 1999

(51) Int. Cl.$^7$ ....................................... G01S 7/40

(52) U.S. Cl. ............................. 342/165; 342/25; 342/89; 342/159; 342/160; 342/162; 342/175; 342/195

(58) Field of Search ........................... 342/165, 169–175, 342/195, 257, 89, 90, 160–164, 73, 159

(56) References Cited
U.S. PATENT DOCUMENTS 4,005,415 * 1/1977 Kossiakoff et al. .................. 342/90

* cited by examiner

Primary Examiner—Bernarr E. Gregory
(74) Attorney, Agent, or Firm—Marsh Fischmann & Breyfogle LLP

(57) ABSTRACT

A method and apparatus for optimizing radar system performance is provided that is independent of any specific radar application. In one embodiment, an optimization system (110) includes an optimization engine (112) and various input modules including constraint module (114), a variable module (116) and an objectives module (118). The input modules provide information sufficient to define an optimization application under analysis. Based on these inputs, the optimization engine (112) identifies an appropriate optimization model and determines optimal radar system parameter values. In this manner, the optimization engine (112) need not be preprogrammed with knowledge of the application under consideration, and is applicable in a variety of context involving different radar system types.

10 Claims, 4 Drawing Sheets

METHOD AND APPARATUS FOR OPTIMIZING RADAR SYSTEM PERFORMANCE

FIELD OF THE INVENTION

The present invention relates generally to radar systems and, in particular, to optimizing radar system performance, e.g., optimizing radar system design and/or operation. The invention provides an optimization tool that can be applied in a variety of applications, for example, with regard to a variety of radar types in a variety of contexts.

BACKGROUND OF THE INVENTION

Radar system design and operation depends on many factors. Some of these factors include the type of radar system (e.g., Synthetic Aperture Radar or Moving Target Indicator), the radar mission (e.g., mapping, air traffic control), the parameter to be optimized (e.g., rate of area coverage, false alarm rates), system Pulse Repetition Frequency (PRF) and other operating parameters, etc. Many such factors are typically considered during the design phase to develop a radar system that satisfies the mission criteria. Such factors may also be considered in operating existing systems to obtain desired data.

Conventional numerical radar performance analyses generally rely on the analyst's knowledge of the specific radar system being analyzed. In this regard, the analyst may define the problem using "rules of thumb" and then apply simple iterative techniques to determine the optimal performance. Corresponding optimization software is generally system specific and/or context specific and therefore has very limited applicability. Accordingly, analysts have generally required separate optimization applications for analyzing radar systems of different types or for implementing different types of optimization functions.

SUMMARY OF THE INVENTION

The present invention is directed to a method and apparatus for optimizing radar system performance that is independent of any specific radar system application. The invention involves a generic optimization engine that obtains the information required for a particular optimization procedure based on standardized inputs and then implements an appropriate optimization procedure based on information derived from the standardized inputs. In this regard, the engine need not be pre-programed with knowledge of a specific radar system type or context under consideration in order to implement an appropriate optimization procedure. Moreover, the engine is not limited to use in connection with any such specific radar system type or context, but rather is applicable across a range of radar system optimization applications for enhanced system design and performance. The invention thereby reduces delays and costs associated with the development of dedicated optimization programs and promotes standardization and reliability with respect to radar system analysis and optimization.

According to one aspect of the invention, a method is provided for optimizing radar system performance. The method involves establishing optimization, constraint, objective, and variable modules along with one or more input modules and operatively interfacing the modules to perform and optimization procedure, e.g., by developing the associated logic and/or running such logic on a computer system. The optimization module uses the constraint, variable, and objective modules to determine the optimal set of radar parameter values for various radar applications involving various types of radar systems, for example, Synthetic Aperture Radar ("SAR") and/or Moving Target Indicator ("MTI") systems. The input module receives inputs sufficient to define the radar application under consideration. Each of the modules may include multiple components. In this regard, the input module may include multiple programs or logic for receiving inputs of multiple types that are used to configure the system constraints module, variables module and objectives module. The optimization module may be capable of selectively implementing any of various optimization techniques including linear, non-linear techniques suitable for use with continuous and discrete variables as configured by the input information. Once configured, the optimization module determines the optimal radar variable values (as configured in the variable module) that satisfy the constraints where optimal is defined by the objective module. By virtue of such operation involving a generic optimization module interfaced with one or more other modules for receiving inputs defining the optimization application, the optimization process is standardized for use in a variety of applications.

The input information can include information of various types for the application under consideration. Such information may involve system constraints, variables and objectives. System constraints include hardware constraints (such as PRF, pulse duration, data rate and power consumption) and operating constraints (such as pulse eclipsing, signal-to-noise (SNR) ratio, ambiguity noise ratio and resolution) as well as related geometry information (such as one or more data collection geometries considered particularly challenging). Potential objectives will typically depend on the mission of the radar system and may include, for example, maximizing rate of area coverage for a mapping mission or maximizing resolution for certain target identification applications. The variables are generally the values that can be varied to optimize performance for a particular application and may include radar pulse duration, PRF, dead time per cycle, and number of pulses per sampling period. It will be appreciated that the same values may be considered a constraint, variable and/or objective depending, for example, on the application, on whether the associated value is a range limit or data point within a range, or on whether the value is taken to be fixed or variable.

This information is preferably received relative to a standardized user interface. For example, the user interface may present a predefined constraint set, a predefined variable set and a predefined objective set, wherein a user is prompted to selectively activate or deactivate selections from the predefined sets and/or to enter values with respect to such selections. In one implementation, the associated program is menu driven and the user is provided with a series of graphical interfaces or screens with check boxes, blanks or other prompts for convenient data entry.

According to another aspect of the present invention, an apparatus is provided for use in optimizing radar system performance. The apparatus includes: an input system for receiving inputs relative to at least one of a predefined constraint set, predefined variable set and predefined objective set; a processing system for analyzing radar system performance for any one of multiple radar system types relative to input information so as to optimize radar system performance; and an output system for outputting information concerning the determined optimal performance. Regarding this "optimal performance," it will be appreciated that such optimization will not necessarily relate to a single or best design or set of operating conditions, but may provide a range of options satisfying some or all of the input criteria, one design or set of operating conditions, not necessarily the "best," satisfying some or all of input criteria, or different system designs or sets of operating conditions that have relative advantages and disadvantages with regard to various operating points for the application under consideration. The input system may include a mouse, keyboard, data port, network connection or other input device and associated logic for processing user inputs or receiving inputs from other programs. The processing system may be embodied as a CPU running logic implementing a generic optimization engine. The output system can include, for example, a printer or screen for providing optimization information directly to a user, a port for transmitting such information access a network, or a CPU executing logic for allowing a further program to access or receive such information.

BRIEF DESCRIPTION OF THE DRAWINGS

For a more complete understanding of the present invention and further advantages thereof, reference is now made to the following detailed description taken in conjunctions with the drawings in which.

DETAILED DESCRIPTION

The following description sets forth the invention and the context of a specific implementation involving radar optimization relative to certain system constraints, variables and objectives. It will be appreciated that the specific parameters, optimization models, radar system types, user interfaces and other details set forth below are provided by way of example only, and the invention is not limited to any specific implementation.

Figure 1:
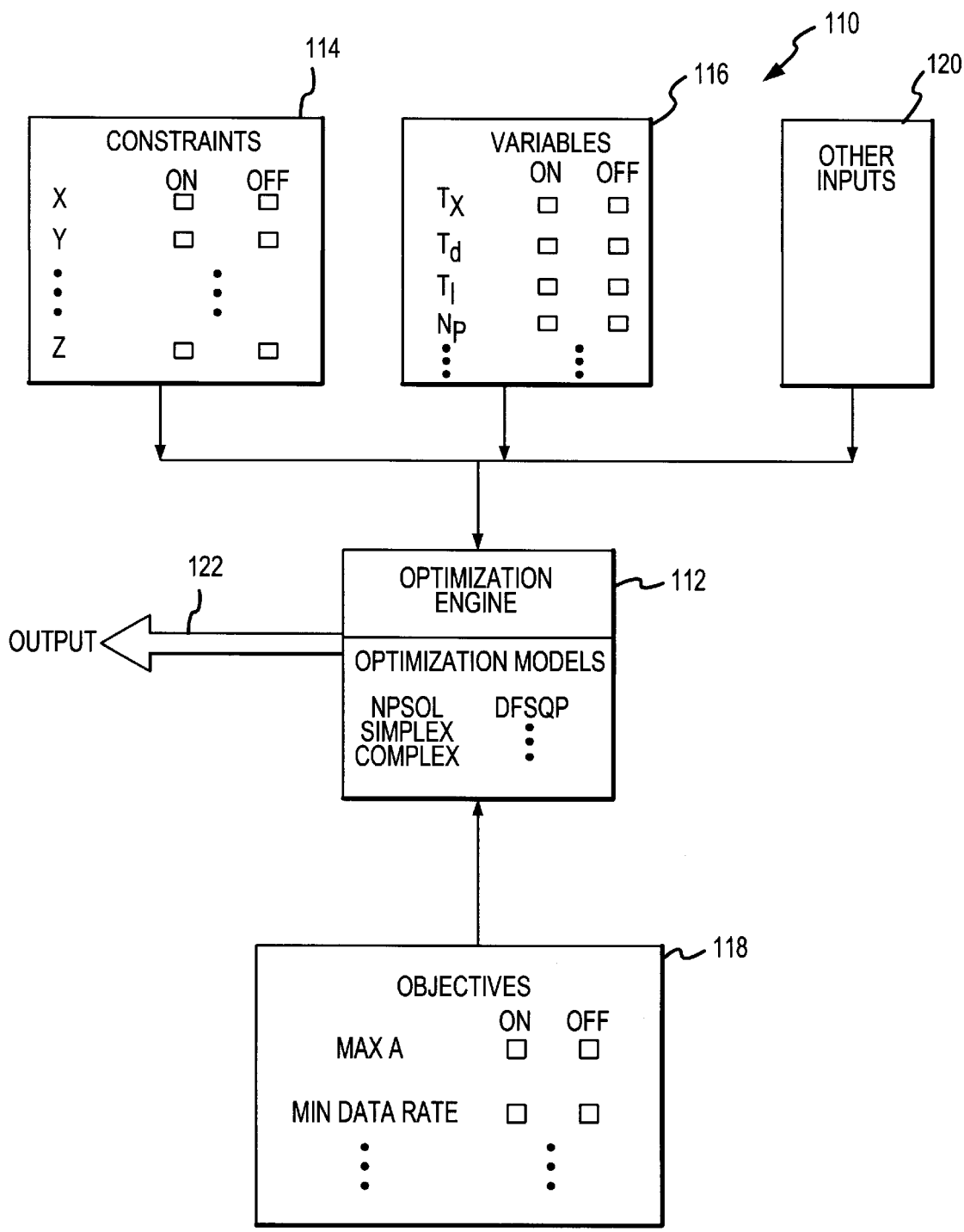
FIG. 1 is a schematic diagram of an optimization system in accordance with the present invention.

FIG. 1 illustrates an overall architecture for an optimization engine system in accordance with the present invention. Generally, the system 110 includes an optimization engine 112, and various input modules 114, 116 and 118 that may include a constraint module 114, a variable module 116 and an objectives module 118 and other input modules (as generally indicated by reference numeral 120) as may be desired. The optimization engine 112 receives inputs from the various modules 114, 116, 118 and 120 and outputs an optimal radar system performance 122 based on the inputs. The illustrated engine 112 and modules 114, 116, 118 and 120 are provided as software or other logic running on the CPU of a computer system and may be provided as a single software package, or in component form, available on a disk or other storage medium, and/or accessible via a public or private network.

The illustrated optimization engine 112 is designed to perform optimization procedures for various applications, involving various radar system types and various radar data acquisition contexts, without requiring pre-programming of the engine 112 with knowledge of the application under consideration. Rather the information required for a specific application is obtained by the engine 112 from the modules 114, 116, 118 and 120 or derived therefrom as will be understood from the description below. In this regard, the engine 112 selectively implements any one of various conventional optimization models depending on the nature of the optimization procedure. Examples of such conventional optimization models that may be executed using the engine 112 include the NPSOL, SIMPLEX, COMPLEX, and DFSQP models. Preferably, the models used by the engine 112 include both linear and non-linear optimization tools.

The constraint module 114 allows the user to input constraints applicable to the radar system application under analysis. The constraints help define an operating envelope for the application in terms of various parameters based on equipment limitations, limitations on available power or other resources, geometric limitations and other factors. These constraints are given as mathematical representations of the rules that govern the behavior of the radar system.

Generally, two important categories of constraints include hardware constraints and operating constraints. The hardware constraints describe the behavior and limitations of the radar system hardware. Examples include limits on PRF, pulse duration, data rate, power consumption, etc. Operating constraints include limitations such as pulse eclipsing (transmitting a pulse when receiving data from the target) as well as functions describing product quality such as SNR ratio.

Many of these constraints are dependent on the platform-to-target ("collection") geometry and, therefore, are applied at a specific geometry or geometries where the constraint becomes binding. In most cases, it is possible to identify one collection geometry or a small number of collection geometries where the constraint is hardest to satisfy. This is the geometry or geometries where the constraint is applied by the optimization engine. Fortunately, such geometries are easily identified for most applications and are often the same for various types of systems. In some cases, however, the limiting geometry is not easily defined and more constraint geometries must be considered in the optimization process. While such applications increase the computational intensity of the optimization process, even these difficult constraints can be readily addressed according to the present invention by addressing all candidate geometries where the constraint may be binding or by iteratively testing various geometries within operating parameters of the hardware/mission to identify the limiting condition or conditions.

The constraints can be applied with different accuracies depending on the optimization task. For example, where the optimization system is used to optimize operation of an existing radar system for a specific application, e.g., mapping, a very high level accuracy may be desired in identifying optimal values of the system operating parameters. However, for other applications such as assessing approximate theoretical maximum performance for various radar systems, a lower level of accuracy may be tolerable. In this regard, the illustrated optimization system allows the user to enter a desired accuracy level in terms of an uncertainty range or specified significant digits in the optimization system output. The optimization system achieves the desired accuracy by increasing or decreasing the number of iterations employed to calculate optimization values, by employing higher/lower accuracy algorithms (e.g., using gradients rather than linear approximations to enhance accuracy), or other mathematical techniques.

The potential constraints are preferably presented to the user in a convenient user interface that allows the user to selectively activate the constraints that are relevant to a particular application. It has been recognized that many common constraints can be provided in a menu form for single bit or on/off implementation. For example, for a given application, the PRF may be taken to be a constraint rather than a variable. If the radar system is defined (as is described below) to allow a PRF between 1400–1750 Hz, the user interface may conveniently allow for selection of PRF values at 50 Hz or other increments across this range (e.g., increments equal to total range divided by the number of menu entries). The user can then select the PRF constraint for a given application by checking a menu box or other such input prompt associated with the associated constraint. Similarly, constraint value options relative to a given constraint may be provided in a pull-down screen or pop-up window. Such user interfaces facilitate ease of use and uniform data entry. Alternatively, the user may key in desired constraint values in a defined format.

The variable input module 116 is used to identify the parameters that the engine 112 can vary in the optimization procedure to identify an optimal performance. In this regard, the engine 112 can determine radar variable values that satisfy the constraints, and the optimal performance can be determined relative to the objectives. In some cases, the same parameters may be included in the user interfaces of the constraint module 114 and variable module 116. The difference between such parameters in such cases depends on whether a particular parameter is taken to be given or variable for the application under consideration. For the case of optimizing the performance of an existing radar system, typical variables may include the radar signal waveform's ramp-up time period ($T_x$), dead time period ($T_d$), or pulse duration ($T_I$) and the number of pulses per sampling period ($N_p$).

Figure 2:
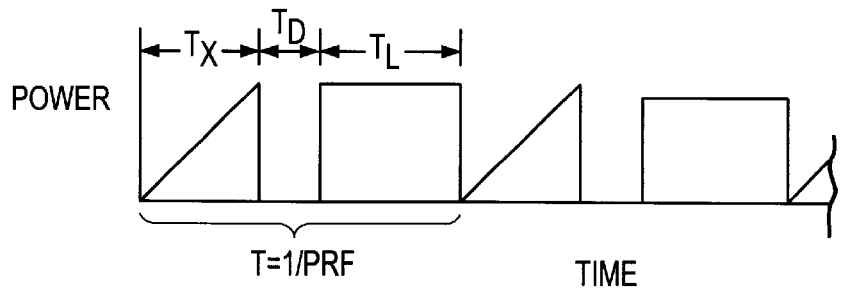
FIG. 2 is a diagram of a typical radar signal waveform illustrating certain parameters that may be used by the optimization system of FIG. 1.

These variables may be understood by reference to FIG. 2. FIG. 2 shows a typical waveform for a radar system pulse sequence. One cycle of the waveform includes a ramping-up portion associated with a first time period, $T_x$, a dead portion associated with a second time period, $T_d$, and a pulse portion associated with a third time period, $T_L$. These three time periods define a cycle period that is the inverse of the PRF. Any or all of these time periods as well as the resulting PRF, can be varied for a given radar system to optimize performance for a given application. In addition, the number of pulses integrated or otherwise used to make a single measurement may be taken to be a variable for a particular application. It will be appreciated that many other parameters may be used as variables. The variables selected define the flexibility of the radar system and/or the range of flexibility allowed by the user for a given optimization application.

In the illustrated embodiment, the potential variables are listed on a menu with check boxes for single bit or on/off implementation, i.e., each potential variable can be selectively activated or deactivated by way of a single input. If a given variable is activated by checking the associated on box, the optimization engine 112 allows the associated variable to vary within the hardware limitations or user selected range included in the system definition, as will be discussed below. In this manner, after the system definition as been entered, optimization procedures can be performed relative to various variables based on convenient point-and-click inputs.

The objectives module 118 allows the user to define the focus of the optimization procedure. It will be appreciated that optimization generally cannot be determined in the abstract. Rather, optimization is a relative determination depending on the objectives of a particular radar application. Some typical objectives that may be the focus of radar system performance optimization include: maximizing the rate of area coverage for a mapping application (e.g., mapping a desert to identify ancient river beds), minimizing data rate (e.g., to reduce processing/power usage while meeting mission requirements), and maximizing resolution (e.g., for target identification/tracking). In the illustrated embodiment, such common objectives are presented in a menu format on a graphical user interface, with check boxes for selective activation of the desired objectives for ease of use.

In addition to the constraint module 114, variable module 116 and objective module 118, other input modules, as generally indicated by reference numeral 120, may be provided to allow the user to input any other information desired for defining a particular optimization application. Other types of information may include, for example, the definition of the radar system hardware including information relating to the number of channels and configuration of the radar system; information concerning the flight path, altitude and attitude of the platform (for down-looking radar systems); and the reflection characteristics of desired targets as well as background features. Preferably, such input information is provided in a menu format where practical.

Based on all of these inputs, the optimization engine selects an optimization model and applies the inputs in the optimization model to determine an optimized performance output 22. The complexity and quantity of the constraint, variable and objective inputs as well as the desired execution time will typically determine the optimization model that will be employed. If all of the constraints and objectives are linear functions of the variables, the best optimization model may be a model that uses this linearity to help solve the problem. On the other hand, if some of the constraints or functions are non-linear functions of one or more of the variables, a non-linear optimization model may be employed. Alternatively, in the non-linear case, the nonlinear function may be approximated as a series of linear segments to reduce processing complexity or processing time, if the resulting decrease in accuracy is tolerable for the subject application. Models that may or may not use gradients or that can handle variables that are discrete can be employed as well.

Figure 3:
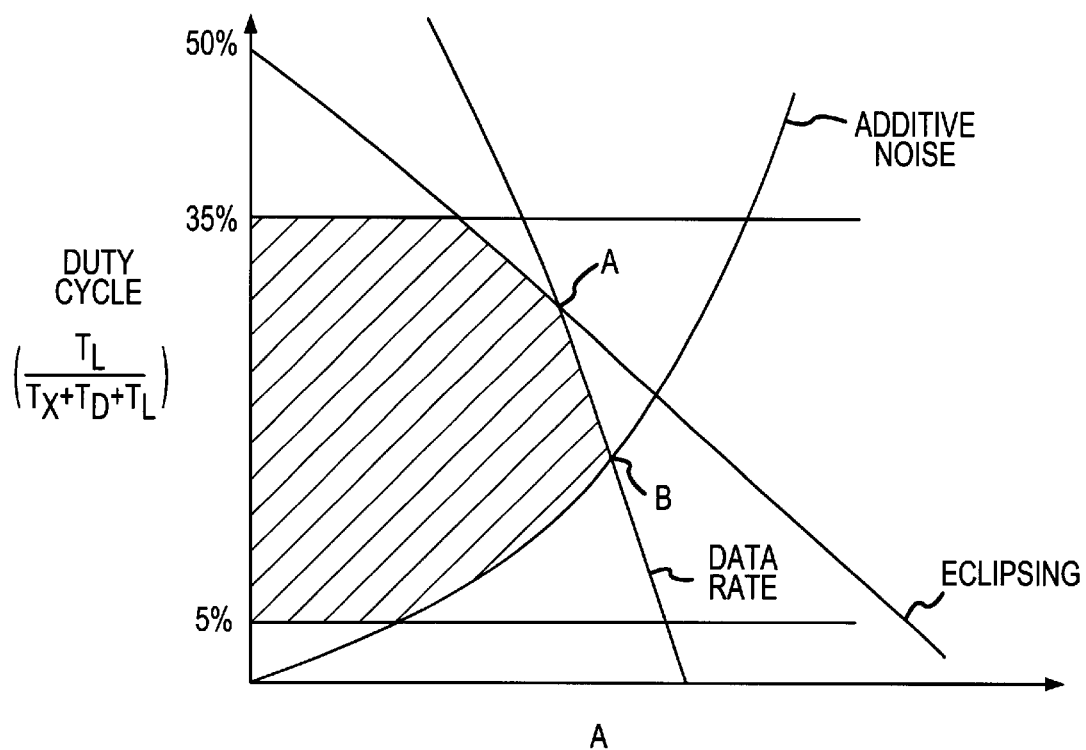
FIG. 3 is a graph illustrating an example of certain constraint functions and objective functions in accordance with the present invention.

The mathematical expression of constraint and objective inputs as functions of variables is graphically represented in FIG. 3. In the illustrated example, the duty cycle ($T_L/T_x + T_d + T_L$) (expressed as a percentage) of the radar system under analysis is taken to be a variable, i.e., the optimization engine allows this parameter to vary in determining an optimal performance. The additive noise (total system noise that is tolerable), eclipsing and data rate are taken to be constraints. Maximizing area coverage is taken to be an objective. In addition, the radar system definition indicates that the system must operate at a duty cycle between 5%–35%. It will be noted that the data rate and eclipsing functions are linear, while the additive noise function is non-linear, indicating that a non-linear optimization model may be preferred depending on the desired accuracy and solution time. The shaded area indicates the operating envelope of the radar system under consideration. The line segment A, B identifies a locus of points that may be examined to determine a maximum rate of area coverage (as it is surmised by the optimization engine that the maximum rate of coverage is likely to coincide with the maximum allowable data rate). Point B indicates the point in the envelope having the greatest rate of area coverage, corresponding to the optimal performance for this optimization application.

Figure 4:
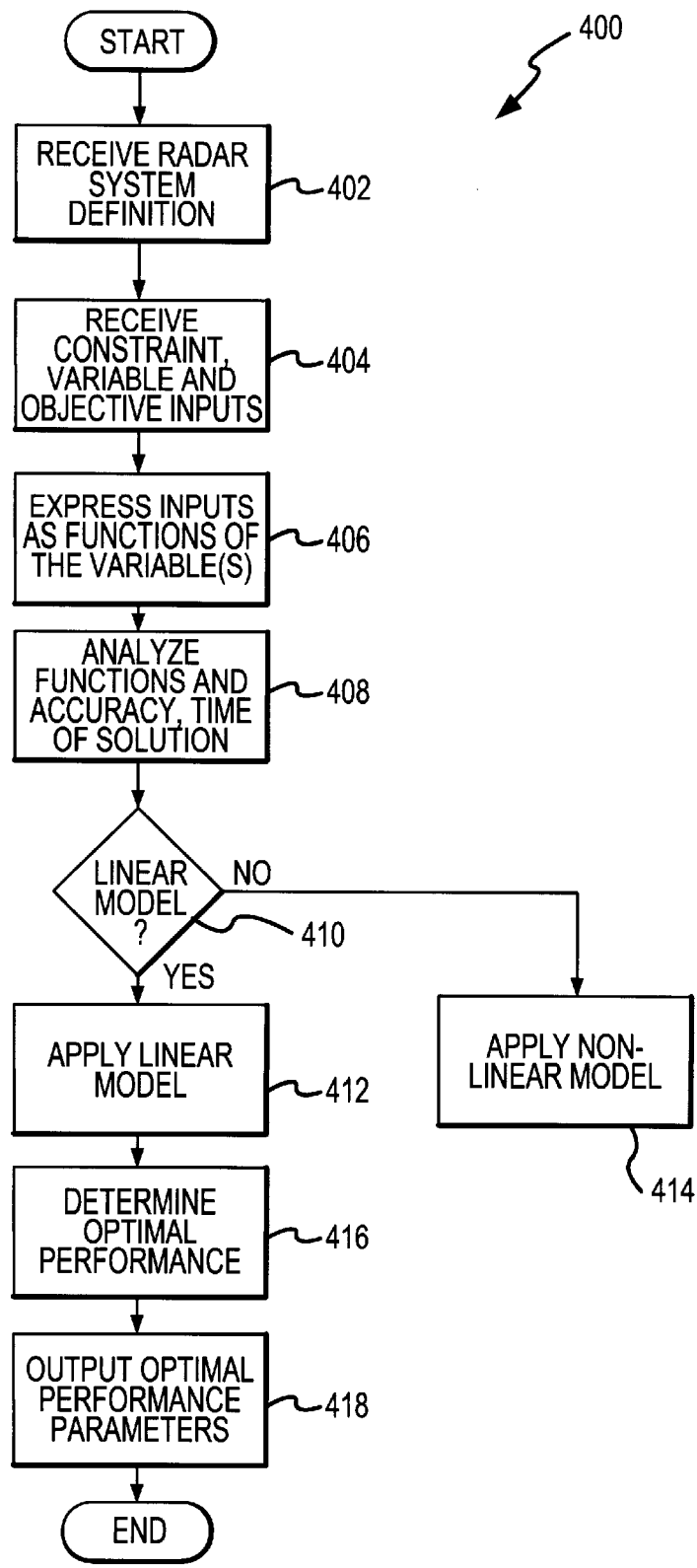
FIG. 4 is a flow diagram illustrating an optimization process in accordance with the present invention.

FIG. 4 is a flow chart summarizing a process (400) implemented by an optimization system according to the present invention. The illustrated process (400) is initiated by receiving (402) a radar system definition. This definition may be provided as part of the constraint, variable and objective modules, and/or by way of other input modules separate from the optimization engine. For example, the radar system definition may provide the following information for a particular application:

Table 1

Hardware Description
  Pulse Repetition Frequency 1400 Hz–1750 Hz
  Pulse Duration: 8.5–40 µs
  Wavelength: 5.7 cm
  Polarization: HH, VV, HV, VH
  Quantization: 8 bits I, 8 bits Q
  Antenna: Phased Array
  Transmitted Power: 2.4 kW
  Incidence Angles: 17°–63°

It will be appreciated that the radar definition may reflect hardware limitations and/or limitations imposed by a user based on the radar mission or other considerations.

The process implemented by the engine then involves: receiving (404) the constraint, variable and objective inputs; mathematically expressing (406) these inputs as constraint and objective functions where these functions are functions of the identified variable(s); analyzing (408) the functions, as well as any accuracy and speed of solution inputs, to identify (410) an appropriate linear or nonlinear optimization model; applying (412 or 414) the constraint, variable and optimization input information, including as information concerning the collection geometry(ies) where the constraints become binding, in the appropriate optimization model; operating the selected optimization model to determine (416) an optimal performance; and outputting (418) optimization information, e.g., by displaying performance parameters on a display or transmitting data to a further application. It will be appreciated that the engine 12 need not be preprogrammed with knowledge concerning the optimization application under consideration. Rather, the engine 12 obtains all the information it needs about the application and the appropriate optimization model from the inputs and analysis thereof. Conventional optimization models can thereby be utilized to support a broad range of optimization applications based on inputs that are application-specific, but can be entered via generic or standardized user interfaces.

Figure 5:
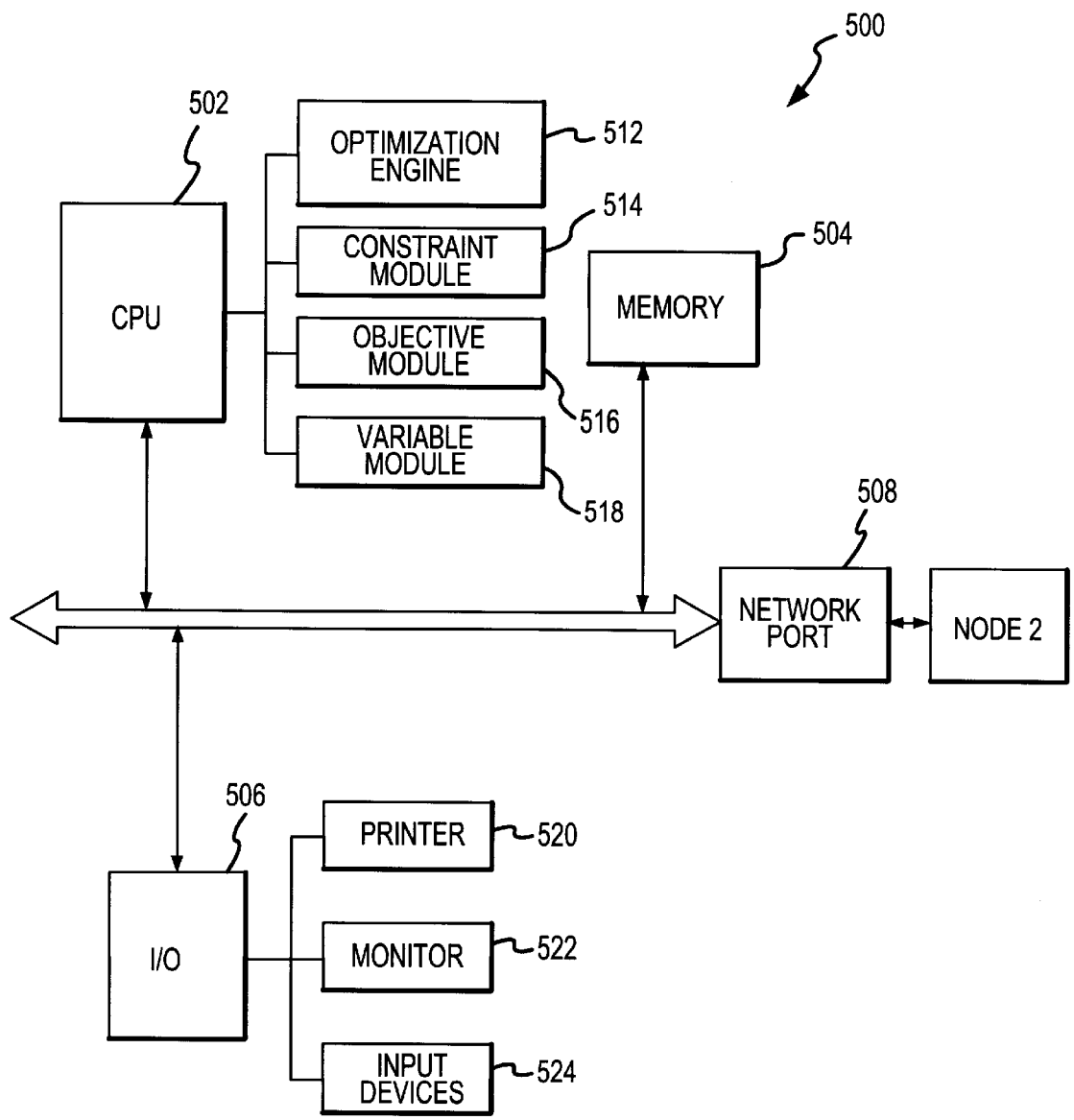
FIG. 5 is a schematic diagram of an optimization apparatus in accordance with the present invention.

FIG. 5 shows a computer system 500 for use in implementing an optimization procedure in accordance with the present invention. Generally, the system 500 includes a CPU 502, a memory 504, an input/output (I/O) system 506, and a network port 508, all interconnected by a data bus 510. The CPU runs the logic for implementing the optimization engine 512, constraint module 514, objective module 516, variable module 518 and all other logic required for operation of the optimization system. The I/O system 506 includes input devices 520, such as a keyboard and a mouse, for receiving user inputs (e.g., menu entries and keypad entries), a monitor 522 for displaying menus or other prompts as well as output optimization parameter values, and a printer for printing screens and output optimization parameters as desired. Memory 504 stores input values, output values, optimization models and other information as required for operation of the optimization system. The network port 508 may be a LAN or WAN port, a modem, or other device for connecting to a further node of a private or public network. The port 508 may be used, for example, to allow users to access the optimization system from other network nodes, to import information relevant to an optimization procedure from other applications, or to output information to other nodes and/or to other applications such as further optimization programs.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in optimizing radar system performance, comprising the steps of:
   providing optimization logic for determining optimized radar parameter values for various radar implementations involving various types of radar systems;
   providing input logic defining a user interface for receiving inputs defining a radar implementation under consideration involving one of said various types of radar systems;
   operatively interfacing said optimization logic and said input logic such that said optimization logic receives information regarding said inputs defining said radar implementation under consideration:
   employing said optimization logic to determine said optimized radar parameter values based on said inputs defining said radar implementation under consideration;
   wherein said optimization logic analyzes radar system performance for said one of said various types of radar systems relative to one of identified radar system constraints, radar system variables and radar system objectives so as to determine an optimal performance for said radar implementation under consideration and determines said optimized radar parameter values based on said optimal performance; and
   using said optimized radar parameter values regarding said radar implementation under consideration to optimize said radar implementation.

2. A method as set forth in claim 1, wherein said step of providing said optimization logic comprises loading said optimization logic onto a computer system.

3. A method as set forth in claim 1, wherein said user interface provides a listing of potential optimization criteria together with prompts for selectively activating each of said criteria.

4. A method as set forth in claim 1, wherein said step of providing input logic comprises loading said input logic onto a computer system.

5. A method as set forth in claim 1, wherein said step of operatively interfacing comprises providing interface logic for obtaining information regarding said inputs and providing said information to said optimization logic.

6. An apparatus for use in optimizing radar system performance, comprising:
   input means for receiving inputs relative to one of a predefined radar system constraint set of potential constraints applicable to radar systems, a predefined variable set of potential variables applicable to radar systems and a predefined objective set including potential objectives for radar system;
   processing means for analyzing radar system performance for any one of a plurality of radar system types relative to one of identified radar system constraints, radar system variables and radar system objectives, so as to determine an optimal performance for a radar system under consideration; and output means for outputting information concerning said determined optimal performance for said radar system under consideration;

wherein a user enters constraint information, variable information and objective information relative to said respective predefined constraint set, predefined variable set and predefined objective set so as to obtain optimization information for radar system under consideration.

7. An apparatus as set forth in claim 6, wherein said input means is adapted for analyzing at least Synthetic Aperture Radar and Moving Target Indication radar systems.

8. An apparatus set forth in claim 6, wherein said input means comprises means for displaying a menu of input selections relative to one of said predefined constraint set, variable set and objective set and receiving user inputs relative to said menu.

9. An apparatus as set forth in claim 6, wherein said processing means comprises a processor for running logic for selectively implementing linear and nonlinear optimization techniques depending on said received inputs.

10. An apparatus as set forth in claim 6, wherein said output means comprises means for providing said information concerning said determined optimal performance to one of a user and an associated program.

* * * * *